United States Patent [19]

Kamutzki et al.

[11] Patent Number: 4,977,239
[45] Date of Patent: Dec. 11, 1990

[54] POLYBASE FROM AMINO AMIDO CARBOXYLIC ACID, POLYAMINE AND DIFUNCTIONAL ALKYLATING AGENT

[75] Inventors: Walter Kamutzki, Dieburg; Karl-Heinz Keil, Hanau-Mittelbuchen, both of Fed. Rep. of Germany

[73] Assignee: Cassella Aktiengesellschaft, Frankfurt am Main, Fed. Rep. of Germany

[21] Appl. No.: 402,519

[22] Filed: Sep. 5, 1989

[30] Foreign Application Priority Data

Oct. 14, 1988 [DE] Fed. Rep. of Germany ....... 3835014

[51] Int. Cl.$^5$ ............................................. C08G 69/26
[52] U.S. Cl. ................................. 528/310; 162/157.3; 210/500.38; 525/420; 525/423; 525/430; 525/435; 528/318
[58] Field of Search ................ 528/310, 328; 525/420, 525/423, 430, 435

[56] References Cited

U.S. PATENT DOCUMENTS 3,305,493 2/1967 Emmons .............................. 528/310

Primary Examiner—Harold D. Anderson
Attorney, Agent, or Firm—Connolly and Hutz

[57] ABSTRACT

A water-soluble organic polybase which is useful for the cationization of asbestos-free, cellulose fiber filter media is prepared by reacting a mixture of a compound of the formula $$R^2-CO-R^1-COOH$$

and a polyalkyleneimine with a difunctional alkylating agent, wherein $R^1$ is a single bond or alkylene having 1 to 10 carbon atoms and $R^2$ is inter alia a moiety of the formula $$H_2N-(CH_2)_u-NH-(CH_2)_u-NH)_w$$

wherein u is the number 2, 3, 4 or 5 and w is the number 0, 1, 2 or 3.

13 Claims, No Drawings

POLYBASE FROM AMINO AMIDO CARBOXYLIC ACID, POLYAMINE AND DIFUNCTIONAL ALKYLATING AGENT

The invention relates to a water-soluble organic polybase, to a process for its preparation and to its use for the cationization of asbestos-free filter media and for improving the wet strength of paper and board.

In industry, asbestos fibres have in many cases proved outstanding for the filtration of fine sediments from liquids such as industrial products, solutions of pharmaceutical products, wine and beer, and other liquids in the food sector. The high activity of asbestos fibres in the filtration of fine suspended particles and fine particles of sediment is primarily attributable to a positive electric charge on the asbestos fibres (positive zeta potential), which electrokinetically captures negatively charged solid particles from the liquid to be filtered. When using asbestos, however, there is the danger of small asbestos fibre particles passing from the filter medium into the liquid to be filtered, during the filtration process, which gives cause for concern because of the health hazard associated with asbestos, especially in the case of liquids in the ordinary and luxury food sectors. For this reason, attempts have already been made to replace asbestos fibres with other filter media, e.g. cellulose fibres, kieselguhr, glass fibres etc. However, such filter media have a negative electric charge (negative zeta potential) during filtration, so the solid particles, most of which are also negatively charged, are only removed from the liquid by means of a purely mechanical straining effect. Filter media of this type are therefore incapable of achieving the filtering power of asbestos fibres.

It is already known to improve the filtering power of asbestos-free filter media by applying cationic organic polyelectrolytes to the filter media. Thus, according to U.S. Pat. No. 3,352,424, polyalkyleneimines, polyalkylenepolyamines, tertiary polyvinylbenzylamines, quaternary polyvinylbenzylammonium salts or polyvinylbenzylsulphonium polymers are applied to kieselguhr, perlite, active charcoal, sand, cellulose and fuller's earth.

German patent No. 24 22 426 describes how the filtering power of a filter made of a negatively charged filter medium can be improved by treatment with a cationic colloid of a melamine-formaldehyde resin. The filter medium here can consist for example of glass fibres, cellulose fibres or a mixture of such fibres and may also contain kieselguhr.

German Auslegeschrift No. 15 46 369 (U.S. Pat. Nos. 2,926,116; 2,961,347; 3,049,469; 3,332,901 and 3,483,077) describes a process for imparting wet strength to paper, board and cellulose-containing material. In this process, the aqueous cellulose fibre suspension is treated with a polyamide-epichlorohydrin condensation product which has been prepared by the polycondensation of saturated aliphatic dicarboxylic acids having 3 to 10 carbon atoms with polyvalent amines of the general formula

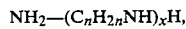

$$NH_2-(C_nH_{2n}NH)_xH,$$

in which n and x are integers with values of at least 2, in a molar ratio to the dicarboxylic acids of 0.8:1 to 1.4:1, at temperatures of 110° to 250° C., and reaction of the resulting polyamides with epichlorohydrin in a manner known per se, at temperatures of 45° to 100° C. As regards the products to be used, German Auslegeschrift No. 15 46 369 also refers to German Auslegeschrift No. 11 77 824 (U.S. Pat. Nos. 2,926,116; 2,961,347; 3,049,469; 3,332,901 and 3,483,077. The latter literature reference states that the polyamide obtained from the dicarboxylic acid and the amine is reacted with epichlorohydrin in an amount such that 0.5 to 1.8 mol, preferably 1.0 to 1.5 mol, of epichlorohydrin are used for every secondary amino group of the polyamide. To improve the storage stability, the reaction with epichlorohydrin is carried out in the presence of a quaternizing agent such as dimethyl sulphate.

European patent application No. A2-131 200 has disclosed water-soluble reaction products of epihalogenohydrin and water-soluble basic polyamidoamines for improving the wet strength of paper, the polyamidoamines being based e.g. on reaction products of aliphatic $C_{4-10}$-dicarboxylic acids with aliphatic polyamines containing at least two primary amino groups and at least one other secondary and/or tertiary amino group, and with monoalkanolamines, the ratio of the sum of the primary NH groups to the carboxyl groups being (0.8–1.4):1 and the ratio of the molar amount of polyamines to alkanolamine being 0.6:0.4 to 0.99:0.01.

The products known from German Auslegeschrift No. 15 46 369, German Auslegeschrift No. 11 77 824 and European patent application No. A2-131 200 are suitable for imparting wet strength to paper, board and the like. However, in common with other similar products, they do not provide an adequate improvement in filtering power when they are used for improving the filtering power of asbestos-free filter media. Furthermore, when dimethyl sulphate and other quaternizing agents are used, residues of these quaternizing agents remain in the products prepared and this gives cause for concern, especially when the treated filter media are used in the food sector.

In attempts cationically to modify the anionic surface of cellulosic filter media by reaction with cationizing reagents such as 3-chloro-2-hydroxypropyltrimethylammonium chloride, by-products are formed which, because of their odour and the anticipated toxicity, make the treated cellulose unusable for filtration purposes since undesirable substances can be expected to pass from the filter medium into the medium to be filtered.

Odour problems arise when cationized starch, i.e. starch which has been reacted with reactive trimethylglycidylammonium chloride, is applied to cellulose. Removal of the unreacted trimethylglycidylammonium chloride from the cationized starch until an odourless cationized cellulose is obtained can only be effected with great difficulty and by using expensive extraction processes.

The results obtained from the treatment processes used hitherto for improving the filtering power of asbestos-free filter media do not match the filtering power of asbestos and/or there are other disadvantages.

It has now been found that the water-soluble organic polybase according to the invention is outstandingly suitable for improving the filtering power of asbestos-free filter media.

The water-soluble organic polybase according to the invention can be prepared by reacting a mixture consisting of 1 part by weight of one or more compounds of formula I:

$$R^2\text{—CO—}R^1\text{—COOH} \qquad (I)$$

and 0.5 to 1.5 parts by weight of one or more polyalkyleneimines of formula II:

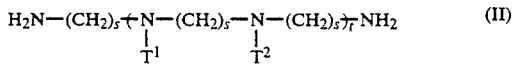

with 0.01 to 5% by weight, based on the mixture of the compounds of formulae I and II, of one or more difunctional alkylating agents, $R^1$ being a direct bond, an alkylene radical having 1 to 10 C atoms, an alkenylene radical having 2 to 10 C atoms or a phenylene radical, $R^2$ being a radical of formula III:

$$H_2N\text{—}(CH_2)_u\text{—NH—}(CH_2)_u\text{—NH}_w \qquad (III)$$

or a radical of formula IV:

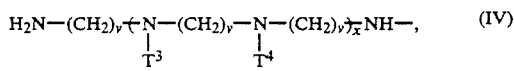

$T^1$ and $T^2$ being hydrogen or the radical —$(CH_2)_s$—$NH)_yH$, $T^3$ and $T^4$ being hydrogen or the radical —$(CH_2)_v$—$NH)_zH$, s, u and v being the number 2, 3, 4 or 5, w being the number 0, 1, 2 or 3 and t, x, y and z being a number such that the compound of formula II or the radical of formula IV has an average molecular weight of 2000 to 30,000.

The compounds of general formula I to be used in the preparation of the water-soluble organic polybases according to the invention can in turn be prepared by reacting one or more dicarboxylic acids of general formula V:

$$HOOC\text{—}R^1\text{—COOH} \qquad (V)$$

with one or more diamines or polyamines of general formula IIIa:

$$H_2N\text{—}(CH_2)_u\text{—NH—}(CH_2)_u\text{—NH}_wH \qquad (IIIa)$$

and/or one or more polyalkyleneimines of general formula IVa:

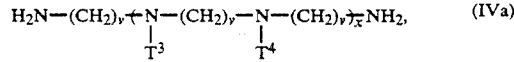

in which $R^1$, u, v, w, x, $T^3$ and $T^4$ are as defined above.

The alkylene or alkenylene radical $R^1$ can be branched or, preferably, linear. A phenylene radical $R^1$ is preferably a 1,4- or 1,2-phenylene radical. Examples of suitable dicarboxylic acids of general formula V are α,ω-dicarboxylic acids such as oxalic acid, malonic acid, succinic acid, glutaric acid, adipic acid, pimelic acid, suberic acid, azelaic acid, sebacic acid, undecanedicarboxylic acid, dodecanedicarboxylic acid, maleic acid, fumaric acid and citraconic acid, as well as phthalic acid and terephthalic acid.

In formulae III and IIIa, u is preferably 2 or 3 and w is preferably 1, 2 or 3. Examples of preferred amines of formula IIIa are diethylenetriamine, dipropylenetriamine, triethylenetetramine and tetraethylenepentamine.

The preparation of the compounds of formula I to be used, from the dicarboxylic acids of formula V and the compounds IIIa and/or IVa, is known (q.v., for example, German Auslegeschrift No. 15 46 369 and German Auslegeschrift No. 11 77 824). It is normally carried out by heating the components, if appropriate in aqueous solution, to temperatures of e.g. 150° to 300° C., preferably under an inert gas, usually nitrogen. If appropriate, the reaction mixture is heated under pressure, e.g. when it is in aqueous solution. The water is then distilled off. In the preparation of the compounds of formula I, the dicarboxylic acids of formula V can also be wholly or partly replaced with appropriate derivatives, especially the anhydrides. In the preparation of the condensation products of formula I, the dicarboxylic acids of formula V and/or their derivatives, especially their anhydrides, are normally reacted with the polyamines of formula IIIa and/or the polyalkyleneimine of formula IVa in a molar ratio of 1:(0.8 to 1.4), preferably of 1:1.

Polyalkyleneimines of formula II or IVa are commercially available. The molecular weight of the polyalkyleneimines of formula II or IVa used is preferably between 2000 and 20,000 and particularly preferably between 2000 and 5000. In formulae II, IV and IVa, s or v is preferably the number 2, in which case commercially available representatives of the compounds of formula II or IVa are commercially available polyethyleneimines. Such polyethyleneimines are prepared by the polymerization of ethyleneimine and contain about 50 to 600 ethyleneimine units and, conventionally, randomly distributed primary, secondary and tertiary nitrogen atoms in a number ratio of about 1:2:1.

The difunctional alkylating agent has e.g. formula VI:

$$A\text{—}Z\text{—}A^1 \qquad (VI),$$

in which A and $A^1$ are identical or different radicals of the formula —$CH_2A^2$ or an epoxy radical (oxirane radical) of formula VII or VIII:

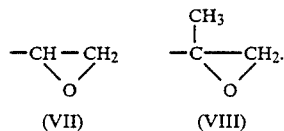

$A^2$ is a substituent which can be eliminated as an anion, especially chlorine, bromine or iodine, or a group which can be eliminated as an anion, e.g. hydroxyl, a sulphato radical, a sulphonyloxy group, especially phenylsulphonyloxy or p-tolylsulphonyloxy, or a phosphato radical, and Z is a direct bond or a divalent organic radical.

Z can be an aliphatic, aromatic or araliphatic radical, it also being possible for aliphatic and araliphatic radicals to contain hydroxyl groups, —OH, keto groups, —CO—, heteroatoms, such as —O— or —S—, or groups containing heteroatoms, such as —SO—, —$SO_2$—, —NH— or —N($CH_3$)—.

In particularly preferred difunctional alkylating agents of formula VI, Z is a direct bond, a phenylene radical, especially a 1,4-phenylene radical, or a radical of the formula —$C_nH_{2n}$— or —$C_nH_{2n}$—G—$C_mH_{2m}$—, in which n and m are a number from 1 to 6 and G is —O—, —S—, —SO—, —$SO_2$—, —NH—, —N($CH_3$)—, —CO—, —CHOH— or phenylene, especially 1,4-phenylene. Preferably, m and n are identical and are 1 or 2, especially 1.

Examples of preferred difunctional alkylating agents of formula VI are: epichlorohydrin (=chloromethyloxirane), epibromohydrin, glycidol (=2,3-epoxypropan-1-ol), 1,3-dichloropropan-2-ol, 2,2'-dichlorodiethyl ether, 2,2'-dichlorodiethylamine, 2,2'-dichlorodiethyl sulphide, 2,2'-dichlorodiethyl sulphoxide, 2,2'-dichlorodiethyl sulphone, 2,2'-bis(sulphato)ethyl ether, 2,2'-bis(phenylsulphonyloxy)ethyl ether, 2,2'-bis(p-tolylsulphonyloxy)ethyl ether, diepoxybutane, diepoxy-2-methylbutane, bis-glycidylamine (=bis(2,3-epoxypropyl)amine), 1,2- or 1,4-bis(epoxyethyl)benzene, 1,2- or 1,4-bis(2,3-epoxypropyl)benzene and 1,2- or 1,4-bis(chloromethyl)benzene.

The water-soluble organic polybases according to the invention can be prepared by reacting a mixture consisting of 1 part by weight of one or more compounds of formula I and 0.5 to 1.5, preferably 0.75 to 1.25 and particularly preferably 0.9 to 1.1 parts by weight of one or more polyalkyleneimines of formula II, with 0.01 to 5, preferably 0.1 to 2 and particularly preferably 0.5 to 1.5% by weight, based on the mixture of the compounds of formulae I and II, of one or more difunctional alkylating agents, especially those of formula VI. The reaction is advantageously carried out in a suitable solvent or in a mixture of suitable solvents. In this reaction, it is advantageous to use the polyalkyleneimine of formula II (which can also be a mixture of different polyalkyleneimines) in the form of the commercially available aqueous solutions, the concentration of which is usually 50% by weight. As solvents, it is preferred to use those which are completely miscible with water over the whole concentration range. Examples of such solvents are lower alkanols such as methanol, ethanol, n- and i-propanol and tert-butanol; alkanediols such as ethylene glycol, propane-1,2-diol, propane-1,3-diol, butane-1,4-diol and butane-2,3-diol; polydiols such as glycerol; ethylene di-, tri- and poly-glycols; glycol ethers such as diethylene glycol monomethyl ether and ethylene glycol monomethyl ether; or bipolar aprotic solvents such as N-methylpyrrolidone, N-methylacetamide, N-dimethylformamide or hexamethylphosphoric triamide. It is particularly advantageous to carry out the reaction in a mixture of water and a completely water-miscible solvent, especially an alkanol and/or alkanediol.

To carry out the reaction, it is normally advantageous to start with an aqueous solution of the polyalkyleneimine of formula II together with the compound of formula I in an amount of water such that the solids content of the solution is approx. 10 to 60% by weight, preferably 20 to 50% by weight, and then to add to this aqueous solution the difunctional alkylating agent dissolved in a suitable, completely water-miscible solvent. The addition is advantageously carried out dropwise, with stirring. The reaction is carried out in the temperature range from 25° C. up to the boiling point of the solution, e.g. up to 100° C., preferably 30° to 60° C. and particularly preferably 40° to 50° C. The reaction is normally complete within 5 to 120 min, preferably 10 to 60 min. When it is complete, the reaction mixture is cooled to room temperature and adjusted to a weakly acidic pH of approx. 4.0 to 6.5, preferably 4.5 to 5.5 and especially about 5, preferably using an acid which is advantageously dilute.

In principle, any inorganic or organic acid is suitable for effecting this pH adjustment, e.g. hydrochloric or hydrobromic acid, naphthalenedisulphonic acids, especially naphthalene-1,5-disulphonic acid, or phosphoric, nitric, sulphuric, oxalic, lactic, glycolic, sorbic, tartaric, acetic, salicylic, benzoic, formic, propionic, pivalic, diethylacetic, malonic, succinic, pimelic, fumaric, maleic, malic, sulphamic, phenylpropionic, gluconic, ascorbic, nicotinic, isonicotinic, methanesulphonic, p-toluenesulphonic, citric or adipic acid. Mixtures of two or more acids can also be used for the pH adjustment. It is preferred to use acids which are favourable, especially physiologically harmless, when the products are later used as cationizing agents for filter media.

After the pH has been adjusted, the mixture is advantageously heated for a further ½ to 7 h, preferably ¾ to 6 h, in the temperature range from 60° to 100° C., especially 60° to 90° C. and preferably 70° to 80° C., in order to stabilize the degree of condensation.

The reaction with the difunctional alkylating agent is accompanied by chain crosslinking, the effect of which is e.g. to increase the K value, which is conventionally measured in dilute solution, e.g. 1% solution. The reaction with the difunctional alkylating agent is preferably carried out in such a way that the K value, e.g. measured in 1% aqueous solution at 25° C., increases by a factor of 1.5 to 4, preferably 1.5 to 3.

In the reaction with the difunctional alkylating agent, the basic N atoms present are reacted only in a molar ratio basic N atom: difunctional alkylating agent of (100 to 1000):1, preferably (200 to 400):1.

The solutions obtained after the reaction with the difunctional alkylating agent contain the polybase according to the invention in a concentration of approx. 10 to 50% by weight, preferably 15 to 35% by weight. These solutions can be used direct for application of the product, especially for the cationization of filter media. It is advantageous, however, to stabilize the degree of condensation of the solutions by adjustment of the pH to a weakly acidic value, preferably followed by heating, and thereby to ensure the storage stability of the product solutions.

The resulting solutions of the water-soluble organic polybases according to the invention can be used direct in the form obtained or after concentration or dilution. They are preferably used for the cationization of asbestos-free filter media which normally have a negative zeta potential during filtration. Examples of such asbestos-free filter media are fibres of organic polymers such as polyacrylate or polypropylene, active charcoal and especially glass fibres, sand, perlite, fuller's earth, glass beads, diatomaceous earth (kiesel-guhr) and, particularly preferably, cellulose fibres. The diameter of the fibres can be about 20 to about 1 μm or less. Sand particles and glass beads can have diameters of up to several hundred μm. However, microporous membranes, such as those prepared e.g. from cellulose esters, are also suitable for a cationizing treatment with the polybases according to the invention.

For cationization, the filter media were brought into contact with preferably aqueous solutions of the polybases, especially solutions such as those obtained when the polybases are produced. This can be done in a variety of ways, e.g. by spraying, roller application or application under pressure or, advantageously, by stirring the filter medium with an aqueous solution of the polybase. However, the filter media can also take the form of filter beds, through which the solution of the polybase according to the invention can be allowed to flow in order to effect cationization.

The concentration and amount of the solution of the polybase used for cationization is chosen so that the amount of polybase used is normally 0.05 to 5% by weight, preferably 0.1 to 2% by weight, based on the filter medium (calculated as solids in each case).

The polybase according to the invention exhausts well from the solution onto the filter medium, after which the filter medium is separated from the liquid, rinsed and dried in a suitable manner. In the cationization of cellulose fibres, the solution of the polybase can be added to the pulp in the pulper or at other points.

The water-soluble organic polybases according to the invention, e.g. in the form of the solutions obtained when they are prepared, are also suitable for imparting wet strength to paper. This treatment for imparting wet strength is carried out in conventional manner, the amounts used being 0.1 to 5% by weight, preferably 0.2 to 5% by weight, based on the cellulose fibres (calculated as solids in each case). The water-soluble polybases according to the invention, e.g. in the form of the solutions obtained when they are prepared, are also suitable as retention agents in the paper industry for improving the retention of the fibrous material and the filler.

Surprisingly, by treating filter media having a negative zeta potential with the non-quaternized polybases according to the invention, it is possible to incorporate a sufficient number of positive charges per gram of filter medium to bring about a considerable improvement in the filtering power of the filter medium. The polybases according to the invention are also ecologically favourable in their preparation and use; thus, for example, they have a low AOX value.

In the framework of the present invention, the starting compounds of formula I which can be used are preferably condensation products or mixtures of condensation products in whose preparation up to 70 mol %, preferably up to 50 mol %, of the dicarboxylic acid of formula V has been replaced with one or more aliphatic monocarboxylic acids having 8 to 22 C atoms, preferably 16 to 20 C atoms, and/or dodecenylsuccinic anhydride. Particularly favourable results are obtained if one or more branched aliphatic monocarboxylic acids, especially isostearic acid, are used as the said monocarboxylic acid. Such mixtures of condensation products, which can be prepared by reacting $(0.3+p)$ mol, preferably $(0.5+r)$ mol, of one or more dicarboxylic acids of formula V:

$$HOOC-R^1-COOH \quad (V)$$

and/or their derivatives, especially their anhydrides, in which $R^1$ is a direct bond, an alkylene radical having 1 to 10 C atoms or an alkenylene radical having 2 to 10 C atoms, and $(0.7-p)$ mol, preferably $(0.5-r)$ mol, of one or more aliphatic monocarboxylic acids having 8 to 22 C atoms, preferably 16 to 20 C atoms, and/or dodecenylsuccinic anhydride of formula IX:

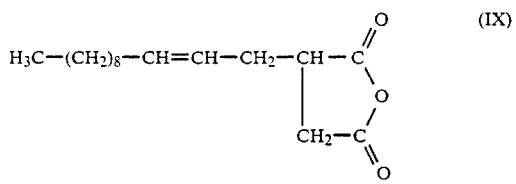

with 0.8 to 1.4 mol, preferably 1 mol, of one or more diamines or polyamines of general formula IIIa:

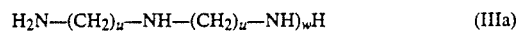

$$H_2N-(CH_2)_u-NH-(CH_2)_u-NH)_wH \quad (IIIa)$$

and/or one or more polyalkyleneimines of general formula IVa:

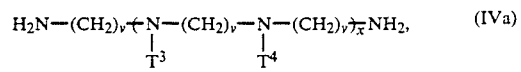

in which
$T^3$ and $T^4$ are hydrogen or the radical $-(CH_2-)_y-NH)_zH$,
u and v are the number 2, 3, 4 or 5,
w is the number 0, 1, 2 or 3,
x and z are numbers such that the compound of formula IVa has a molecular weight of 2000 to 30,000,
p is a number from 0 to 0.68 and
r is a number from 0 to 0.48,
are novel. Their method of preparation is analogous to that indicated for the products of formula I, i.e. a mixture of $(0.3+p)$ mol, preferably $(0.5+r)$ mol, of one or more dicarboxylic acids of formula V and/or their derivatives, especially their anhydrides, and $(0.7-p)$ mol, preferably $(0.5-r)$ mol, of one or more aliphatic monocarboxylic acids having 8 to 22 C atoms, preferably 16 to 20 C atoms, and/or dodecenylsuccinic anhydride, is reacted with 0.8 to 1.4 mol, preferably 1 mol, of one or more diamines or polyamines of general formula IIIa and/or one or more polyalkyleneimines of general formula IVa, the components, if appropriate in aqueous solution, normally being heated to temperatures of e.g. 150° to 300° C., preferably under an inert gas, usually nitrogen. If appropriate, the reaction mixture must be heated under pressure, e.g. when it is in aqueous solution. The water is then distilled off. If desired, the resulting condensation products can be further diluted with water. They can be used in anhydrous form or in the form of their aqueous solutions.

Examples of suitable aliphatic monocarboxylic acids having 8 to 22 C atoms are: caprylic, capric, pelargonic, lauric, myristic, palmitic, stearic, isostearic, arachidic, behenic, undecenoic, oleic, ricinoleic and linoleic acids.

In the following Examples, percentages are by weight.

EXAMPLE 1

190 g of technical-grade polyethyleneimine in the form of a 50% aqueous solution, together with 96 g of the condensation product of 1 mol of diethylenetriamine and 1 mol of adipic acid, are initially introduced into a 2-liter four-necked stirred flask equipped with an anchor stirrer, a reflux condenser, a dropping funnel and a thermometer, the content is then adjusted to 25% with 284 g of distilled $H_2O$ and the reaction mixture is heated to an internal temperature of 40° C. 3.7 g of a 30% solution of epichlorohydrin in ethanol are added dropwise over 5 minutes, the components are condensed at 40°–50° C. for 20 min and the reaction mixture is then cooled to 20° C. with ice/$H_2O$ and adjusted to a pH of 5 with 159 g of conc. formic acid/$H_2O$ 1:1. The degree of condensation is stabilized by heating at 70° C. for three hours.

K value (before crosslinking): $36 \cdot 10^{10}$ measured in 1% solution at 25° C.

K value (after condensation): 72·10³ measured in 1% solution at 25° C.

EXAMPLE 2

380 g of technical-grade polyethyleneimine in the form of a 50% aqueous solution, together with 198 g of the condensation product of 1 mol of azelaic acid and 1 mol of dipropylenetriamine, are initially introduced into a 2-liter four-necked stirred flask equipped with an anchor stirrer, a reflux condenser, a dropping funnel and a thermometer, the content is then adjusted to a total of 25% with 568 g of distilled H₂O and the reaction mixture is heated to an internal temperature of 50° C. 7.4 g of a 30% solution of epichlorohydrin in i-propanol are added dropwise over 10 min, the components are condensed at 40°–50° C. for 30 min, the reaction mixture is then cooled to 20° C. with ice/H₂O and adjusted to a pH of 5 with 162 g of acetic acid/H₂O 1:1 and the degree of condensation is stabilized by heating at 75° C. for 5 h.

K value (before crosslinking): 36·10³ measured in 1% solution at 25° C.

K value (after crosslinking): 65·10³ measured in 1% solution at 25° C.

EXAMPLE 3

285 g of technical-grade polyethyleneimine in the form of a 50% aqueous solution, together with 144 g of the condensation product of 103 g (1 mol) of diethylenetriamine, 73 g (0.5 mol) of adipic acid and 134 g (0.5 mol) of dodecenylsuccinic anhydride, are initially introduced into a 1-liter four-necked stirred flask equipped with an anchor stirrer, a reflux condenser, a dropping funnel and a thermometer, the content is then adjusted to 40% with 284 g of H₂O and the reaction mixture is then brought to an internal temperature of 40° C. 5.5 g of a 30% solution of epichlorohydrin in ethanol are subsequently added dropwise over 5 min, the components are condensed at 40°–50° C. for 20 min and the reaction mixture is then cooled to 20° C. with ice/H₂O and adjusted to a pH of 5 with 238.5 g of conc. formic acid/H₂O 1:1. The degree of condensation is stabilized by heating at 70° C. for 1 h.

K value (before crosslinking): 36·10³ measured in 1% solution at 25° C.

K value (after crosslinking): 85·10³ measured in 1% solution at 25° C.

EXAMPLE 4

190 g of technical-grade polyethyleneimine in the form of a 50% aqueous solution, together with 96 g of the condensation product of 138.7 g (0.5 mol) of adipic acid, 9.5 g (0.05 mol) of isostearic acid and 103 g (1.0 mol) of diethylenetriamine, are initially introduced into a 2-liter four-necked stirred flask equipped with an anchor stirrer, a reflux condenser, a dropping funnel and a thermometer, and the content is then adjusted to 25% with 284 g of distilled H₂O. 3.7 g of a 30% solution of epichlorohydrin in ethanol are then added dropwise over 5 min, the components are condensed at 40° to 50° C. for 30 min and the reaction mixture is cooled to 20° C. with ice/H₂O and adjusted to a pH of 5 with 245 g of glacial acetic acid/H₂O 1:1. Condensation is then continued at 80° C. for 1 h.

K value (before crosslinking): 15.8·10³ measured in 1% solution at 25° C.

K value (after crosslinking): 33.4·10³ measured in 1% solution at 25° C.

EXAMPLE 5

36.4 g of drinking water, together with 82.5 g (0.8 mol) of diethylenetriamine, are initially introduced into a 700 ml four-necked flask equipped with an anchor stirrer, a thermometer and an ordinary condenser with receiver, and 111.7 g (0.76 mol) of adipic acid and 7.6 g (0.04 mol) of isostearic acid are added, with cooling. A further 3.6 g of H₂O are then added and the reaction mixture is heated slowly to an internal temperature of 200° over 120 min and condensed for 2 h. A total of 52.7 g of H₂O are distilled off. The condensation product is then adjusted to 52% with distilled H₂O.

EXAMPLE 6

91 g of distilled water and 206 g (2 mol) of diethylenetriamine are initially introduced into a 1000 ml four-necked flask equipped with an anchor stirrer, a thermometer and an ordinary condenser with receiver, and 87.6 g (0.6 mol) of adipic acid, 182 g of H₂O, 268 g (1 mol) of dodecenylsuccinic anhydride and 76 g (0.4 mol) of isostearic acid are added, with cooling. The reaction mixture is then heated to an internal temperature of 180° to 190° C. over 2 h and 316.6 g of H₂O are distilled off through the condenser.

The condensation product obtained is adjusted to a 59.2% aqueous solution.

EXAMPLE 7

31 g of H₂O and 262 g (2 mol) of dipropylenetriamine are initially introduced into a 1 l four-necked flask equipped with an anchor stirrer, a thermometer and an ordinary condenser with receiver, 146 g (1 mol) of adipic acid, 182 g of H₂O and 268 g (1 mol) of dodecenylsuccinic anhydride are added, with cooling, and the reaction mixture is heated to 200° over 2 h. The components are then condensed for 2 h and a total of 316.4 g of H₂O are distilled off through the condenser.

The condensation product obtained is adjusted with 426.8 g of H₂O.

EXAMPLE 8

91 g of H₂O and 206 g (2 mol) of diethylenetriamine are initially introduced into a 1 l four-necked flask equipped with an anchor stirrer, a thermometer and an ordinary condenser with receiver, and 146 g (1 mol) of adipic acid, 182 g of H₂O and 268 g (1 mol) of dodecenylsuccinic anhydride are added, with cooling. The reaction mixture is then heated to an internal temperature of 200° C. over 2 h and the components are condensed at this temperature for 2 h, 303 g of water being distilled off. The reaction product is then adjusted to 30% with H₂O.

EXAMPLE 9

The extent to which the polybase according to the invention improves filtering power is tested in the following manner:

Bleached sulphite spruce pulp is lightly beaten by means of a laboratory refiner until a Schopper-Riegler freeness of 23° SR is obtained. Test sheets weighing 60 g/m² are formed with the resulting pulp on a Rapid Köthen sheet-forming machine. So that they are sufficiently porous for filtration processes, the sheets formed are not couched. They are dried for 5 min on a can dryer heated with saturated steam at 100° C., the felt being tensioned.

The following are prepared in the manner described:

(1) sheets without additive,
(2) sheets with addition of 0.5% of the polybase of Example no. 1 according to the invention,
(3) sheets with addition of 0.5% of a product of Example no. 1b according to European patent application No. A2-131 200.

The addition is calculated on the basis of solids in each case. Filter paper discs with a diameter of 12 cm are cut out of the filter papers prepared.

The filtering efficiency of the three types of paper is tested with the aid of suspensions of fine solids in water. The following solids are used:
(a) a commercially available perlite filter aid with a modal particle diameter of 4 μm,
(b) a commercially available type of kieselguhr for filtration, with a modal particle diameter of 6 μm,
(c) a commercially available chalk for paper coating slips, with a mean particle diameter of 0.7 μm.

1 g of each of the products a, b and c is suspended in 1 l of softened water. The filter discs, cut to 12 cm, are placed in a suction filter. 250 ml of each of the suspensions are sucked through by means of a water-jet vacuum. The Table lists the mean transmission values of the individual filtrates. Softened water with a transmission of 100% is used as the reference quantity.

TABLE

| Filter bed | Transmission values of the filtrates of the products | | |
|---|---|---|---|
| | a | b | c |
| 1 | 84.5 | 45.6 | 31.4 |
| 2 | 96.3 | 77.8 | 44.2 |
| 3 | 93.3 | 68.4 | 34.5 |

EXPLANATIONS

The filter beds 1, 2 and 3 and the suspensions of the products a, b and c are explained before the Table. The filter bed 1 is untreated, the filter bed 2 is treated with a polybase according to the invention and the filter bed 3 is treated with an agent from the state of the art.

What is claimed is:

1. A water-soluble organic polybase which is prepared by reacting a mixture of about 1 part by weight of one or more carboxylic compounds of formula (I)

$$R^2-CO-R^1-COOH \qquad (I)$$

and about 0.5 to 1.5 parts by weight of one or more polyalkylene imines of formula (II)

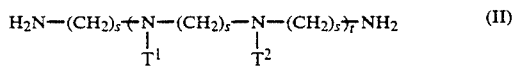

with about 0.01 to 5% by weight, based on the mixture of the compounds of formulae (I) and (II), of one or more difunctional alkylating agents,
wherein
$R^1$ is a single bond, or $R'$ is alkylene having 1 to 10 carbon atoms, alkenylene having 2 to 10 carbon atoms or phenylene;
$R^2$ is a moiety of the formula (III)

or a moiety of the formula (IV)

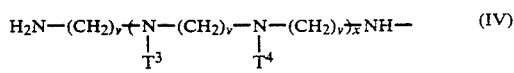

wherein
$T^1$ and $T^2$ are hydrogen or $-(CH_2)_s-NH)_yH$;
$T^3$ and $T^4$ are hydrogen or $-(CH_2)_v-NH)_zH$;
s, u and v are each, independent of the other, the number 2, 3, 4 or 5;
w is the number 0, 1, 2 or 3; and
t, x, y and z are each, independent of the other, a number such that the compound of formula (II) or the moiety of formula (IV) has an average molecular weight of 2,000 to 30,000.

2. A polybase according to claim 1 prepared by reacting a mixture of 1 part by weight of one or more compounds of formula (I) and 0.75 to 1.25 parts by weight of a compound of formula (II).

3. A polybase according to claim 2 prepared by reacting a mixture of 1 part by weight of one or more compounds of formula (I) and 0.9 to 1.1 parts by weight or a compound of formula (II).

4. A polybase according to claim 2 prepared by reacting the mixture of one or more compounds of formula (I) and one or more compounds of formula (II) with 0.1 to 2% by weight, based on the mixture of the compounds of formula (I) and (II), of one or more difunctional alkylating agents.

5. A polybase according to claim 4 wherein the amount of difunctional alkylating agent is 0.5 to 1.5% by weight.

6. A polybase according to claim 1 prepared by reacting the mixture of one or more compounds of formula (I) and one or more compounds of formula (II) with 0.1 to 2% by weight, based on the mixture of the compounds of formulae (I) and (II), of one or more difunctional alkylating agents.

7. A polybase according to claim 6 wherein the amount of difunctional alkylating agent is 0.5 to 1.5% by weight.

8. A polybase according to claim 6 wherein the difunctional alkylating agent has the formula $$A-Z-A^1$$

in which A and $A^1$ are identical or different and each is $-CH_2A^2$ or an epoxy moiety of the formula

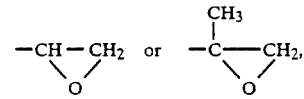

$A^2$ is a substituent which can be split off as an anion; and Z is a direct bond or Z is a divalent organic radical.

9. A polybase according to claim 8 wherein $A^2$ is chloro, iodo, bromo, hydroxyl, sulphato, sulphonyloxy, phenylsulphonyloxy or p-tolylsulphonyloxy; and Z is phenylene, $-C_nH_{2n}-$ or $-C_nH_{2n}-G-C_mH_{2m}-$, wherein n and m are, each independent of the other, a number from 1 to 6 and G is $-O-$, $-S-$, $-SO-$, $-SO_2-$, $-NH-$, $-N(CH_3)-$, $-CO-$, $-CHOH-$ or phenylene.

10. A process for the preparation of a water-soluble organic polybase which comprises reacting a mixture consisting of 1 part by weight of one or more compounds of formula (I)

$$R^2-CO-R^1-COOH \quad (I)$$

and 0.5 to 1.5 parts by weight, of one or more polyalkyleneimines of formula (II)

$$H_2N-(CH_2)_s-(N-(CH_2)_s-N-(CH_2)_s)_T-NH_2 \quad (II)$$
$$\quad\quad\quad\quad\quad |\quad\quad\quad\quad |$$
$$\quad\quad\quad\quad\quad T^1\quad\quad\quad\quad T^2$$

with 0.01 to 5% by weight, based on the mixture of the compounds of formulae (I) and (II), of one or more difunctional alkylating agents of formula $$A-Z-A^1$$

wherein
$R^1$ is a single bond or $R^1$ is an alkylene having 1 to 10 carbon atoms, an alkenylene having 2 to 10 carbon atoms or phenylene;
$R^2$ is a moiety of the formula (III)

$$H_2N-(CH_2)_u-NH-(CH_2)_u-NH)_w \quad (III)$$

or a moiety of the formula (IV)

$$H_2N-(CH_2)_v-(N-(CH_2)_v-N-(CH_2)_v)_x-NH- \quad (IV)$$
$$\quad\quad\quad\quad\quad |\quad\quad\quad\quad |$$
$$\quad\quad\quad\quad\quad T^3\quad\quad\quad\quad T^4$$

wherein
$T^1$ and $T^2$ are hydrogen or $-(CH_2)_s-NH)_yH$;
$T^3$ and $T^4$ are hydrogen or $-(CH_2)_v-NH)_zH$;
s, u and v are each, independent of the other, the number 2, 3, 4 or 5;
w is the number 0, 1, 2 or 3; and
t, x, y and z are each, independent of the other, a number such that the compound of formula (II) or the moiety of formula (IV) has an average molecular weight of 2,000 to 30,000;
A and $A^1$ are identical or different and each is $-CH_2A^2$ or an epoxy moiety of the formula

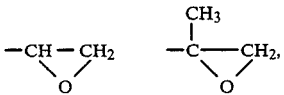

wherein $A^2$ is a substituent which can be split off as an anion; and Z is a direct bond or Z is a divalent organic radical, at a temperature from 25° to 60° C., in a solvent, adjusting the resulting reaction mixture pH to 4 to 6.5, and then heating the reaction mixture to 60° to 90° C.

11. The process according to claim 10 wherein the amount of compounds of formula (II) is 0.75 to 1.25 parts by weight.

12. The process according to claim 10 wherein the amount of compounds of formula (II) is 0.9 to 1.1 parts by weight and the amount of alkylating agents is 0.1 to 2% by weight.

13. The process according to claim 10 wherein for the alkylating agent $A^2$ is chloro, iodo, bromo, hydroxyl, sulphato, sulphonyloxy, phenylsulphonyloxy, or p-tolylsulphonyloxy; and Z is a direct bond or Z is phenylene, the formula $-C_nH_{2n}-$ or the formula $-C_nH_{2n}-G-C_mH_{2m}-$, wherein n and m are, each independent of the other, a number from 1 to 6 and G is $-O-$, $-S-$, $-SO-$, $-SO_2-$, $-NH-$, $-N(CH_3)-$, $-CO-$, $-CHOH-$ or phenylene.

* * * * *